(12) United States Patent
O'Reilly

(10) Patent No.: US 8,061,057 B2
(45) Date of Patent: Nov. 22, 2011

(54) WASTE TREATMENT SYSTEM

(75) Inventor: Dominick O'Reilly, Cohayo (IE)

(73) Assignee: Hydrocell Technologies, Ballyhaunis, County Mayo (IE)

( * ) Notice: Subject to any disclaimer, the term of this patent is extended or adjusted under 35 U.S.C. 154(b) by 0 days.

(21) Appl. No.: 11/824,808

(22) Filed: Jul. 3, 2007

(65) Prior Publication Data

US 2009/0008312 A1    Jan. 8, 2009

(51) Int. Cl.
*F26B 5/14* (2006.01)
(52) U.S. Cl. ............... 34/386; 34/398; 34/418; 34/427
(58) Field of Classification Search .............. 34/398, 34/354, 386, 418, 60, 69, 70, 427
See application file for complete search history.

(56) References Cited

U.S. PATENT DOCUMENTS

| | | | |
|---|---|---|---|
| 4,081,366 A | 3/1978 | O'Donnell | |
| 4,224,780 A * | 9/1980 | Rewitzer | 53/436 |
| 4,595,506 A | 6/1986 | Kneer | 210/609 |
| 4,710,298 A | 12/1987 | Noda et al. | 210/505 |
| 4,750,274 A * | 6/1988 | Erdman et al. | 34/520 |
| 4,787,323 A * | 11/1988 | Beer et al. | 110/346 |
| 4,895,577 A | 1/1990 | Chornet et al. | 44/33 |
| 5,772,721 A * | 6/1998 | Kazemzadeh | 71/11 |
| 2010/0096336 A1 | 4/2010 | O'Reilly | |

FOREIGN PATENT DOCUMENTS

JP    62097699 A    *    5/1987

OTHER PUBLICATIONS

PCT Search Report and associated documents, dated Jun. 23, 2009.
D1 WO96/06804, Published Mar. 7, 1996.
D3 WO92/07049, Published Apr. 30, 1992.
D4 WO 2007/060379, Published May 31, 2007.
D5 WO96/07620, Published Mar. 14, 1996.
D6 EP0153282, Published Aug. 28, 1985.
D7 DE4409649, In German w/o translation, Publ. ?.
D8 WO9401369, Published Jan. 20, 1994.
D9 JP2001-334294, Published Apr. 12, 2001.
D11 DE2950333, In German w/o translation, Publ. ?.
D13 WO 97/01513 A, Published Jan. 16, 1997.
D14 DE 3919001 A!, Published Dec. 13, 1990.
D15 EP 1810748 A!, Published Jul. 25, 2007.
Non-final Office Action for U.S. Appl. No. 12/288,568, filed Oct. 22, 2008 and mailed from the USPTO on Sep. 16, 2009, 6 pgs.
Final Office Action for U.S. Appl. No. 12/288,568, filed Oct. 22, 2008 and mailed from the USPTO on Mar. 9, 2010, 11 pgs.

* cited by examiner

*Primary Examiner* — Jiping Lu
(74) *Attorney, Agent, or Firm* — John R. Thompson; Stoel Rives LLP

(57) ABSTRACT

A system for removing water from sludge is disclosed. The system (100) includes: de-watering (102) sludge comprising an output from a wastewater treatment system to form a semi-solid sludge cake; dispensing (104) the sludge in a sludge hopper and dispensing a blending material in a recipient blending material hopper; depositing (106) the sludge and the blending material in a mixing device; mixing (108) the sludge and the blending material having a porous structure in a weight ratio of the sludge to the blending material of about from 2:1 to about 10:1; and compressing (110) the sludge and the blending material to release moisture. Advantageously, the system (100) provides an improved method of de-watering sludge, for more efficient processing, transporting and recycling, depending on the application.

13 Claims, 3 Drawing Sheets

WASTE TREATMENT SYSTEM

FIELD OF THE INVENTION

The present invention relates to an improved system for treating waste, and in particular a sludge or a bio-solid material from a wastewater treatment plant, for example human or animal waste.

BACKGROUND TO THE INVENTION

In practically all municipal wastewater treatment plants, waste water is separated into treated water and waste material. The waste material is in the form of a sludge comprising both solid and liquid material, the majority of the material being liquid. Before transporting the waste material from one location to another for further processing, it is advantageous to remove as much moisture or liquid from the sludge as possible, as this reduces the weight of the sludge. Also, the lower the percentage of moisture or liquid in the sludge, the lesser the chance of groundwater contamination due to seepage from the sludge.

It is known to initially de-water the sludge into a semi-solid sludge cake through drying and/or settling techniques. However, this sludge cake retains a substantial portion of moisture, requiring further treatment.

It is also known to employ compression apparatus, for example belt presses, filter presses, screw presses, centrifuges, in an effort to squeeze moisture out of the sludge cake. However, because of the consistency of the sludge cake, or due to the presence of certain polymers or flocculants within the sludge itself, it can be quite difficult to effectively eliminate moisture content beyond a certain level from the sludge. In general, conventional techniques are only capable of eliminating that level of moisture to achieve a moisture content of 75-80% in such waste material. Under further compression, the sludge tends to bind and ooze in any direction possible, effectively behaving like a hydraulic fluid.

A system for solving this problem would be considered an improvement in the art.

BRIEF DESCRIPTION OF THE DRAWINGS

An embodiment of the invention will now be described, by way of example, with reference to the following drawings, in which.

DESCRIPTION OF A PREFERRED EMBODIMENT

According to the present invention there is provided a method of removing water from sludge. The method comprises adding to the sludge a blending material having a porous structure in a weight ratio of relatively wet sludge to relatively dry blending material of about from 2:1 to about 10:1.

As used herein, the term "sludge" has its common ordinary meaning, and is intended to mean the solid, semi-solid, or liquid waste or precipitate generated in the treatment of wastewater (e.g. sewage or slurry).

In a preferred embodiment, the blending material is a compressible material.

Advantageously, the introduction of a suitable blending material into the sludge prior to compression can result in a greater portion of moisture being removed from the sludge, in some cases approaching or in excess of about 60-70% moisture removal, which is considered a substantial improvement in the field.

Suitable blending materials can vary and in one embodiment can include cellulose-based materials, for example wood shavings, newsprint and milled peat. In addition, trommel fines, for example, the particles collected via trommel screens during the recycling of household waste, can also be employed as a blending material. Open-cell sponges can also be used.

In one embodiment, the blending material comprises fine wood dust, and in a preferred embodiment, it is treated with a urea formaldehyde resin.

It has been found that dust collected during the machining of Medium Density Fibreboard (MDF) is also effective as a blending material, for example, what is referred to as sander dust.

In one embodiment, the ratio of sludge to blending material is from about 2:1 to about 10:1, and preferably from about 8:1 to about 10:1, dependent on such factors, as the type of waist and the moisture content of the waist, for example.

Figure 1:
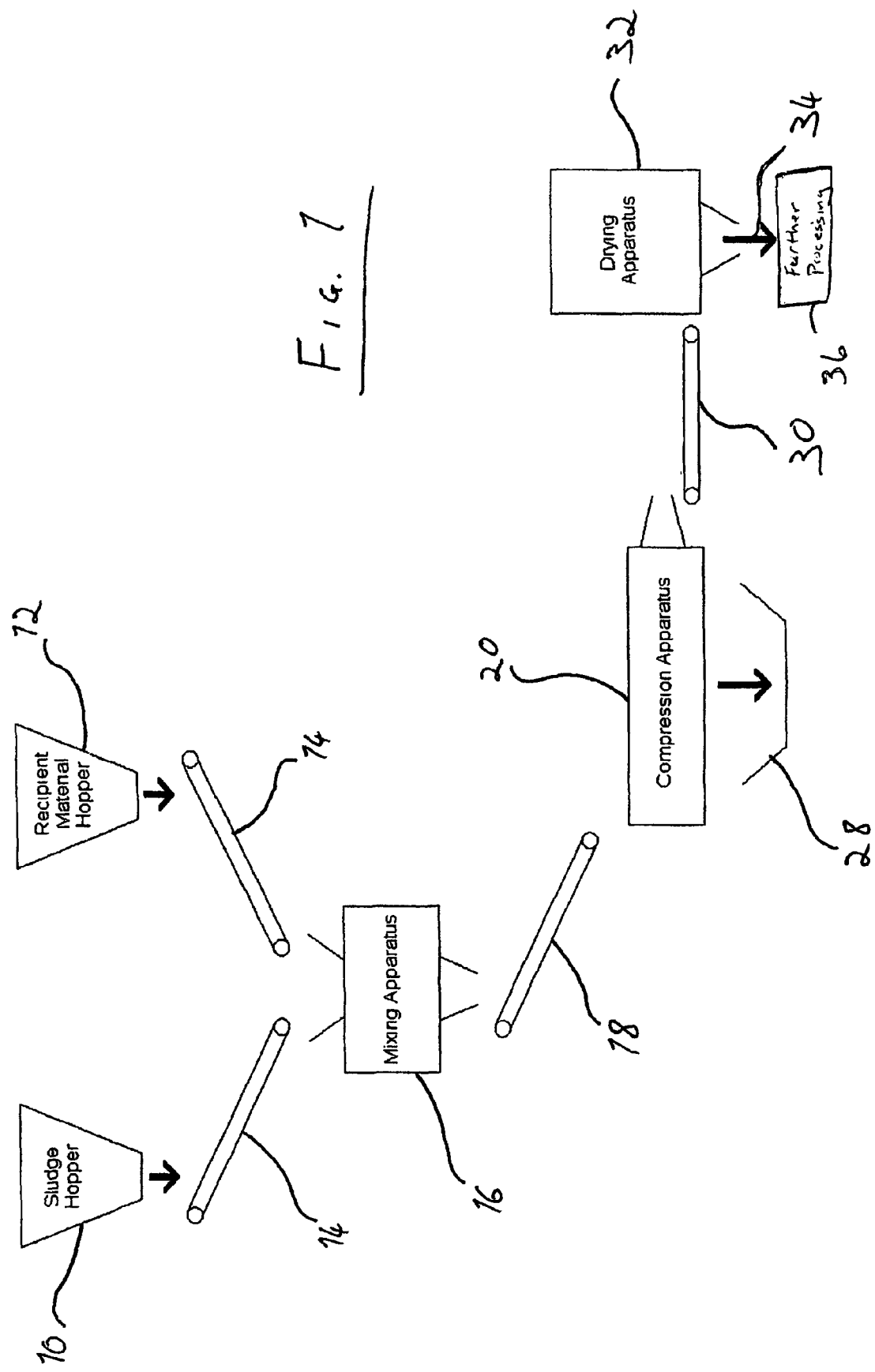
FIG. 1 is a schematic drawing of a waste treatment system, in accordance with the instant invention.

Referring to FIG. 1, a waste treatment system according to a preferred embodiment is shown. Sludge, as output from a wastewater treatment plant or other suitable producer of wastewater material, is initially de-watered into a semi-solid sludge cake. The sludge cake is collected in a sludge hopper 10. A suitable blending material to be mixed with the sludge cake is collected in a hopper 12.

Preferably, the blending material is a compressible material. Suitable blending materials include cellulose-based materials, for example wood shavings, newsprint and milled peat. Dust collected during the machining of Medium Density Fibreboard (MDF) is also effective as a blending material, also referred to as sander dust. In addition, trommel fines or particles collected via trommel screens during the recycling of household waste, can also be employed as blending material. Open-cell sponges may also be used.

In a preferred embodiment, fine wood dust treated with a urea formaldehyde resin can provide good results when used as a blending material. A urea formaldehyde resin is found in MDF wood dust, and it is believed that the presence of this resin contributes to the effectiveness of the compression.

In more detail, tests performed by the applicant suggest that the presence of the resin solidifies the MDF dust particles, substantially minimizes the possibility of and/or substantially prevents the particles from collapsing under the pressure exerted during compression. The applicant believes that the rigidity of the resin solidifies the MDF dust particles, to effectively provide an escape route for the water or moisture, out of the material, while minimizing the composite material from acting like a consistent hydraulic fluid.

As shown in FIG. 1, the sludge cake and the blending material are dispensed from their respective hoppers 10,12 to separate conveyors 14. The sludge cake and the blending material are deposited into a suitable mixing apparatus 16. It will be understood by those skilled in the art, that the mixing apparatus 16 may be chosen from at least one of a paddle mixer, screw mixer, agri feed mixer and any mixing or blending device, as known in the art.

The mixing apparatus 16 blends the sludge cake and the blending material together to create a composite mixture. The mixing apparatus is operable to mix the sludge cake and the blending material together, preferably at a slow rate, such that the mixture is folded together rather than beaten, for improved mixing for example.

In a preferred embodiment, the mixing process is performed by folding successive layers of sludge cake into contact with layers of the blending material. Further mixing is accomplished through the continued folding together of layers of the composite mixture, until the concentration of the composite mixture is substantially evenly spread.

The ratio of blending material to sludge cake in the composite mixture may be adjusted depending on the type of blending material used. For example, when using wood shavings, a sludge cake to blending material weight ratio of about 10:1 has been found to be most effective, while in the case of milled peat the preferred ratio is about 2.5:1.

In the case of MDF dust material, a preferred ratio of sludge cake to dust ranges from about 5:1 to about 2.5:1, depending on the dry matter content of the sludge cake.

As shown in FIG. 1, the composite mixture exits the mixing apparatus 16 onto a conveyor 18. The composite mixture is then delivered to a compression apparatus 20. The compression apparatus 20 may be chosen from any one of a belt press, a screw press, a plate press, a batch press, a filter press, a hydraulic press, or any compression device as known in the art. The compression apparatus 20 is configured to allow the release of moisture from the contained mixture during compression.

For example, the compression apparatus 20 may comprise a plate press having a conveyor located within the compression apparatus to firstly convey the composite mixture into the compression apparatus, and to secondly convey the composite mixture after compression out of the compression apparatus for further processing. The conveyor can be configured to allow the release of moisture from the contained mixture during compression. For example, in the case of a standard belt conveyor, the belt can be perforated to allow the moisture to drain through the conveyor belt. One or more of the plates used in the plate press can also be perforated, to allow the escape of moisture during compression.

Figure 2:
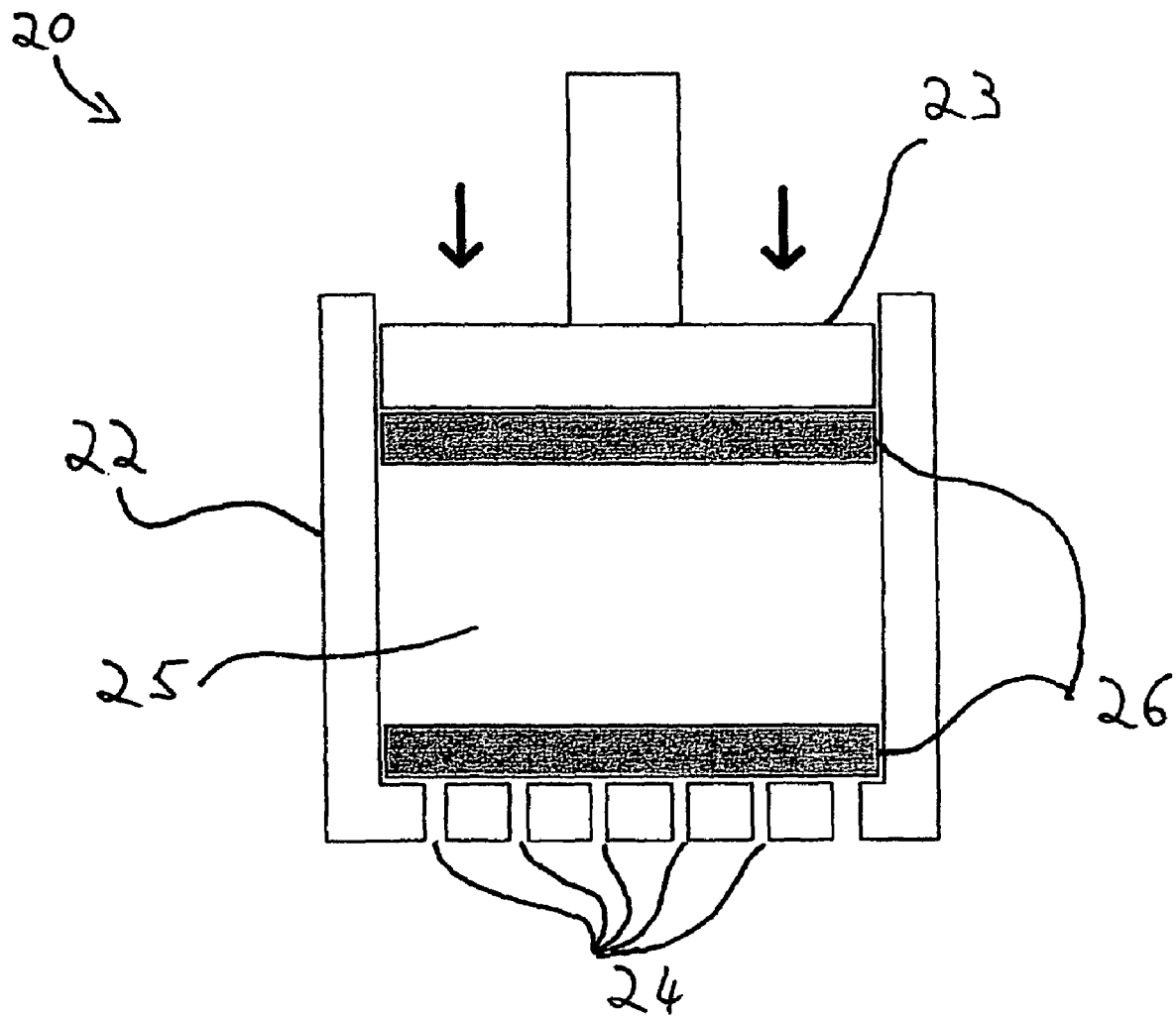
FIG. 2 is a cross-sectional view of a sample compression apparatus of FIG. 1.

As shown in FIG. 2, a cross-section of a sample compression apparatus 20 is depicted. In this case, an enclosed plate press 22 comprising a compression ram 23 and an interior chamber 25, is shown. The compression apparatus 20 is provided with a series of apertures 24 to allow the drainage of moisture from the device 20. In FIG. 2 of the plate press 22, the apertures 24 are provided in the surface of the plate press 22 that the compression ram 23 acts against.

Initially, the ram 23 is maintained in an 'at rest' position at that side of the plate press 22 opposite to the apertures 24, for example, the top of the plate press 22. In order to prevent the composite mixture itself from being squeezed through the apertures during compression, a filter material 26 is provided over the apertures 24 and over the surface of the ram 23 acting on the composite mixture. The filter material 26 can be made from any porous material that allows through passage of liquids and minimizes the flow of solids, for example, such as cotton.

In operation, the composite mixture is supplied to the interior chamber 25 of the plate press 22. During compression, the ram 23 is driven in a downwards direction, towards the apertures 24. As the composite material is compressed, moisture is forced from the mixture, in the form of wastewater. The expelled wastewater then passes through the filter material 26, and exits the plate press 22 through the apertures 24. Referring back to FIG. 1, the wastewater is then collected in a suitable drain 28.

It will be understood that the above configuration for the plate press may be adapted as required for the other types of compression apparatus as mentioned, i.e. that the compression apparatus are configured to allow the escape of wastewater during compression, while retaining the solid material.

Preferably, the compression generally occurs at pressures between 1379 kPa (200 psi) and 13789 kPa (2000 psi). A large amount of wastewater is expelled from the mixture at lower pressures, but if compression is maintained at these levels, the majority of wastewater is substantially eliminated from the mixture. In a preferred embodiment, the pressure is applied gradually, and is maintained for a period of time to ensure maximum de-watering of the composite mixture. For example, for a portion of composite mixture having a width of approximately 101.6 cm (40 inches) and a depth of approximately 101.6 cm (40 inches), the period of time for compression to substantially ensure maximum dewatering should be at least 30 seconds.

The wastewater expelled from the composite mixture can then be returned to the wastewater treatment plant for further processing and refinement.

The presence of the blending material in the composite mixture allows for a greater proportion of moisture to be squeezed from the sludge cake. Expelling the moisture from the composite mixture produces a substantially de-watered resultant material, with a dry solids content of upwards of 35%.

The resultant material is removed from the compression device 20 and brought by conveyor 30 to drying apparatus 32. The substantially de-watered resultant material is more easily dried due to the reduced levels of moisture present. The drying apparatus 32 can be one of a cyclonic dryer, a thermal dryer, an air dryer, a drum dryer, or any drying device as known in the art, for example the Tempest Drying System manufactured by GRRO Incorporated is one such device.

After drying, the resultant material is substantially solid. The solid material exits the drying apparatus at 34 and can then be further processed (system or apparatus) 36, depending on the application. For example, the further processing 36 can be a pelletiser, to convert the solid material into pellets for burning as fuel.

It will be understood that the resultant material can also be utilised as a substitute for the blending material to be mixed with the sludge cake. It has been found that the resultant material produced by the process may be re-used as blending material for approximately three iterations, before the de-watering effects start to decline.

In an alternate embodiment, the mixing and compression steps can be performed on location at a waste treatment plant, with the drying (and possibly pelletising) steps performed at a remote location. In this case, the drying apparatus 32 in FIG. 1 may be replaced by a truck or suitable transport device that transfers the resultant material output from the compression apparatus 20 to a centralised location where the drying and pelletising stages are carried out.

Alternatively, the waste treatment apparatus itself may be provided as part of a mobile waste collection system. In this case, the hoppers 10, 12, mixing apparatus 16, and compression apparatus 20 are provided as part of a vehicle, for example on the rear of a truck, or on a truck trailer. The drying apparatus 32 may optionally be provided as part of the vehicle or, as above, the drying and further processing stages of the method may be performed at a remote location. An advantage of this mobile system is that businesses, for example farmers, that may not be able to afford construction of the system or would not be in a position to continually utilise the system, could be visited by the mobile apparatus, such as by a waste service provider, for the treatment of their waste.

Use of this process or system, can result in a reduced moisture-level end product, with more manageable properties and a dry solids content approaching upwards of 50-70%. The end material is substantially reduced in weight as opposed to conventional moisture extraction techniques, and is more easily transportable.

Figure 3:
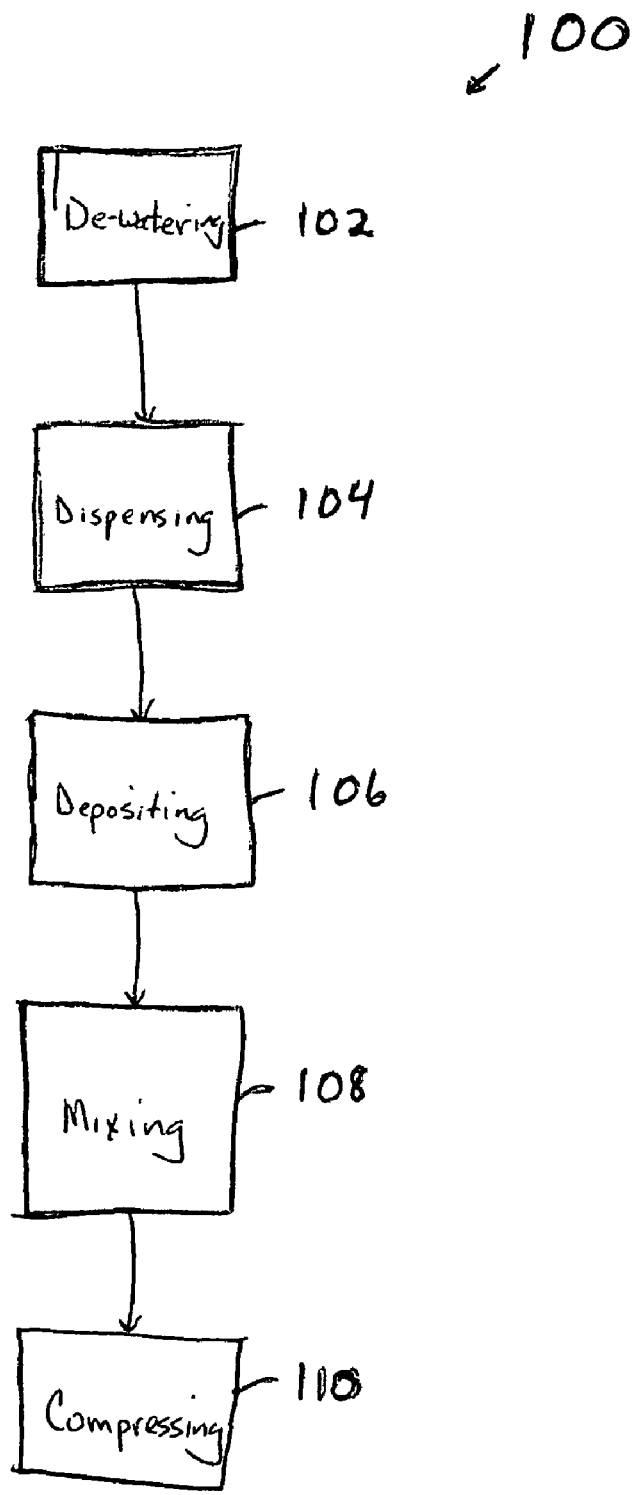
FIG. 3 is a flow diagram of an embodiment of the system, in accordance with the invention.

As shown in FIG. 3, a system for removing water from sludge 100, is shown. In its simplest form, the system 100 includes: de-watering 102 sludge comprising an output from a wastewater treatment system to form a semi-solid sludge cake; dispensing 104 the sludge in a sludge hopper and dispensing a blending material in a recipient blending material hopper; depositing 106 the sludge and the blending material in a mixing device; mixing 108 the sludge and the blending material having a porous structure in a weight ratio of the sludge to the blending material of about from 2:1 to about 10:1; and compressing 110 the sludge and the blending material to release moisture.

Advantageously, the system 100 provides an improved method of de-watering sludge, for more efficient processing, transporting and recycling, depending on the application.

As detailed herein, in a preferred embodiment the blending material comprises a cellulose-based material treated with a urea formaldehyde resin, such as dust collected from machining of Medium Density Fibreboard (MDF).

In a preferred embodiment, the mixing step 108 includes folding successive layers of sludge cake with the blending material and forming a composite mixture, such that the sludge and blending material are substantially evenly spread, for improved de-moisturization.

Also in preferred embodiments, relative to the mixing step 108, the weight ratio of the sludge cake to blending material is about 10:1 when the blending material comprises wood shavings, the weight ratio of the sludge cake to blending material is about 2.5:1 when the blending material comprises milled peat, and the weight ratio of the sludge cake to blending material is about 5:1 to about 2.5:1 when the blending material comprises a cellulose-based material treated with a urea formaldehyde resin, for improved de-watering of sludge.

The system 100 can further include at least one of drying the compressed mix in the compressing step 110, and converting it to form a solid material adapted for use as fuel, re-use as a blending material and the like.

Example One

The following table shows the weight reduction produced in a small bench scale experiment for a number of different mixtures. A chamber which was twelve inches deep and had a six inch diameter was filled with 4, 6 and 8 inches of sludge and the indicated mixture. The chamber had a series of holes on the floor spaced about one centimeter apart in a series of decreasing circular arrangements. The about 40 holes had about a five millimeter diameter. A filter was placed adjacent to the floor and comprised a conventional porous belt. A like sized circular piston with a substantially flat and circular end was used to apply a downward pressure toward the floor of the chamber for about 30 to 60 seconds. The initial pressure was about 200 psi and final pressure was about 1000 psi. It was observed that most of the water escaped through the holes upon the initial downward pressure, and thereafter additional water exited the chamber. In more detail, a large amount of wastewater was expelled from the mixture at lower pressures, but if compression is maintained, additional wastewater is expelled as well from the mixture.

TABLE 1

| Mixture | Weights | Total Before | Total After | Reduction |
|---|---|---|---|---|
| Wood Shavings | 50 g | 550 g | 190 g | 360 g |
| Biosolids (13% Dry Solids) | 500 g | | | |
| Milled Peat | 200 g | 700 g | 325 g | 375 g |
| Biosolids (13% Dry Solids) | 500 g | | | |
| Shredded Newsprint | 20 g | 200 g | 80 g | 120 g |
| Biosolids (11% Dry Solids) | 180 g | | | | g equals grams

As should be understood by those skilled in the art, the invention is not limited to the embodiments described herein, and may be modified or varied without departing from the scope of the invention.

The invention claimed is:

1. A method for removing water from sludge comprising the steps of:
   de-watering the sludge by compression;
   after de-watering the sludge by compression, mixing the sludge and a compressible blending material such that the blending material is distributed throughout the sludge in a substantially uniform manner to form a mixture;
   providing a compression apparatus including a compression ram and a plate press, the plate press comprising a plurality of apertures vertically disposed below the compression ram to enable gravitational pull of water through the apertures;
   disposing a porous material on the plate press to cover the plurality of apertures, said porous material allows through passage of liquids and minimizes flow of solids;
   disposing the mixture of sludge and blending material on the porous material and below the compression ram; and
   the compression ram compressing the mixture of sludge and blending material against the porous material and the plate press to release water through the apertures.

2. The method of claim 1, wherein the blending material includes at least one of: a cellulose-based material including at least one of wood shavings, newsprint and milled peat; trommel fines and open-cell sponges.

3. The method of claim 1, wherein the blending material comprises a cellulose-based material treated with a urea formaldehyde resin.

4. The method of claim 1, wherein the blending material comprises a dust collected from machining of Medium Density Fibreboard (MDF).

5. The method of claim 1, wherein the weight ratio of the sludge to the blending material is from about 2:1 to about 10:1.

6. The method of claim 1, wherein at least one step is performed in connection with a mobile device.

7. A method for de-watering semi-solid sludge cake comprising an output from a wastewater treatment system, comprising:
   de-watering the semi-solid sludge cake by compression;
   after de-watering the semi-solid sludge cake by compression, dispensing the semi-solid sludge cake in a hopper and dispensing a blending material in a recipient blending material hopper;
   depositing the semi-solid sludge cake and the blending material in a mixing device;
   mixing the semi-solid sludge cake and the blending material having a porous structure in a weight ratio of the semi-solid sludge cake to the blending material of about from 2:1 to about 10:1, such that the blending material is distributed throughout the sludge cake in a substantially uniform manner to form a mixture providing a compression apparatus including a compression ram and a plate press, the plate press comprising a plurality of apertures vertically disposed below the compression ram to enable gravitational pull of water through the apertures;

disposing a porous material on the plate press to cover the plurality of apertures, said porous material allows through passage of liquids and minimizes flow of solids;

disposing the mixture of semi-solid sludge cake and blending material on the porous material and below the compression ram; and the compression ram compressing the mixture of semi-solid sludge cake and blending material against the porous material and the plate press to release water through the apertures, wherein the blending material includes at least one of: a cellulose-based material including at least one of wood shavings, newsprint, milled peat, trommel fines, open-cell sponges, and dust collected from machining of Medium Density Fibreboard (MDF).

8. The method of claim 7, wherein the blending material comprises a cellulose-based material treated with a urea formaldehyde resin.

9. A method for de-watering semi-solid sludge cake comprising an output from a wastewater treatment system comprising:

de-watering the semi-solid sludge cake by compression;

after de-watering the semi-solid sludge cake by compression, dispensing the semi-solid sludge cake in a hopper and dispensing a blending material in a recipient blending material hopper;

depositing the semi-solid sludge cake and the blending material in a mixing device;

mixing the semi-solid sludge cake and the blending material having a porous structure in a weight ratio of the semi-solid sludge cake to the blending material of about from 2:1 to about 10:1, such that the blending material is distributed throughout the sludge cake in a substantially uniform manner to form a mixture;

providing a compression apparatus including a compression ram and a plate press, the plate press comprising a plurality of apertures vertically disposed below the compression ram to enable gravitational pull of water through the apertures;

disposing a porous material on the plate press to cover the plurality of apertures, said porous material allows through passage of liquids and minimizes flow of solids;

disposing the mixture of semi-solid sludge cake and blending material on the porous material and below the compression ram; and the compression ram compressing the mixture of semi-solid sludge cake and blending material against the porous material and the plate press to release water through the apertures.

10. The method of claim 9, wherein the blending material comprises a cellulose-based material treated with a urea formaldehyde resin.

11. The method of claim 9, wherein the blending material comprises a dust collected from machining of Medium Density Fibreboard (MDF).

12. The method of claim 9, wherein the weight ratio of the semi-solid sludge cake to blending material is about 10:1 when the blending material comprises wood shavings, the weight ratio of the semi-solid sludge cake to blending material is about 2.5:1 when the blending material comprises milled peat, and the weight ratio of the semi-solid sludge cake to blending material is about 5:1 to about 2.5:1 when the blending material comprises a cellulose-based material treated with a urea formaldehyde resin.

13. The method of claim 9, further comprising at least one of drying the compressed mix, and converting to form a solid material adapted for use as fuel or re-use as a blending material.

* * * * *